United States Patent [19]

Tenenbaum

[11] Patent Number: 4,691,343

[45] Date of Patent: Sep. 1, 1987

[54] NOISE ELIMINATION SYSTEM FOR PICTURES AND THE LIKE

[76] Inventor: David M. Tenenbaum, 75 Palmer St. Apt. 214, Quincy, Mass. 02169

[21] Appl. No.: 867,488

[22] Filed: May 27, 1986

[51] Int. Cl.$^4$ .......................................... H04M 11/00
[52] U.S. Cl. .................................. 379/100; 358/281; 358/284
[58] Field of Search .......................... 379/96, 97, 100; 370/110.1, 110.2; 358/281, 282, 284

[56] References Cited

U.S. PATENT DOCUMENTS

| | | | |
|---|---|---|---|
| 2,289,157 | 7/1942 | Whitaker | 358/281 |
| 2,290,229 | 7/1942 | Finch | 358/281 |
| 4,313,139 | 1/1982 | Logie | 358/281 |
| 4,485,400 | 11/1984 | Lemelson et al. | 358/85 |
| 4,517,531 | 5/1985 | Tan et al. | 358/281 X |
| 4,561,117 | 12/1985 | Kuhn | 455/608 |

FOREIGN PATENT DOCUMENTS

| | | | |
|---|---|---|---|
| 3230726 | 2/1984 | Fed. Rep. of Germany | 370/110.1 |
| 0007226 | 1/1979 | Japan | 358/284 |
| 0156414 | 12/1979 | Japan | 358/284 |
| 0117831 | 7/1984 | Japan | 370/110.1 |
| 0033781 | 2/1985 | Japan | 358/284 |

*Primary Examiner*—Gene Z. Rubinson
*Assistant Examiner*—Matthew E. Connors
*Attorney, Agent, or Firm*—Robert K. Tendler

[57] ABSTRACT

In an amplitude-modulated or frequency modulated audio signal transmission system, a system for eliminating breakup of transmissions of photographs, negatives or any rapidly changing audio signal transmitted from one remote location to another over standard telephone lines and networks includes superimposing an audio carrier signal on the signal from the picture or information transmitting unit, in which the superimposed carrier is of a frequency different from that of the operating frequency of the transmitter yet within the telephone network bandwidth. A decoder is utilized at the receiver end which includes a peak filter tuned to the transmitter frequency which is followed by a deep notch filter to remove the superimposed carrier, so as to eliminate breakup of picture quality at the receiver end due to a rapid transition in amplitude or frequency of the signals derived from a dark portion of the picture or negative adjacent a light portion, such that breakup or interference introduced by the telephone network is eliminated from the received picture copy output. In one embodiment, a simple amplitude responsive measuring device utilizing a single LED indicator is used to set the gain of the decoder which when once set, need not be adjusted during transmission.

20 Claims, 6 Drawing Figures

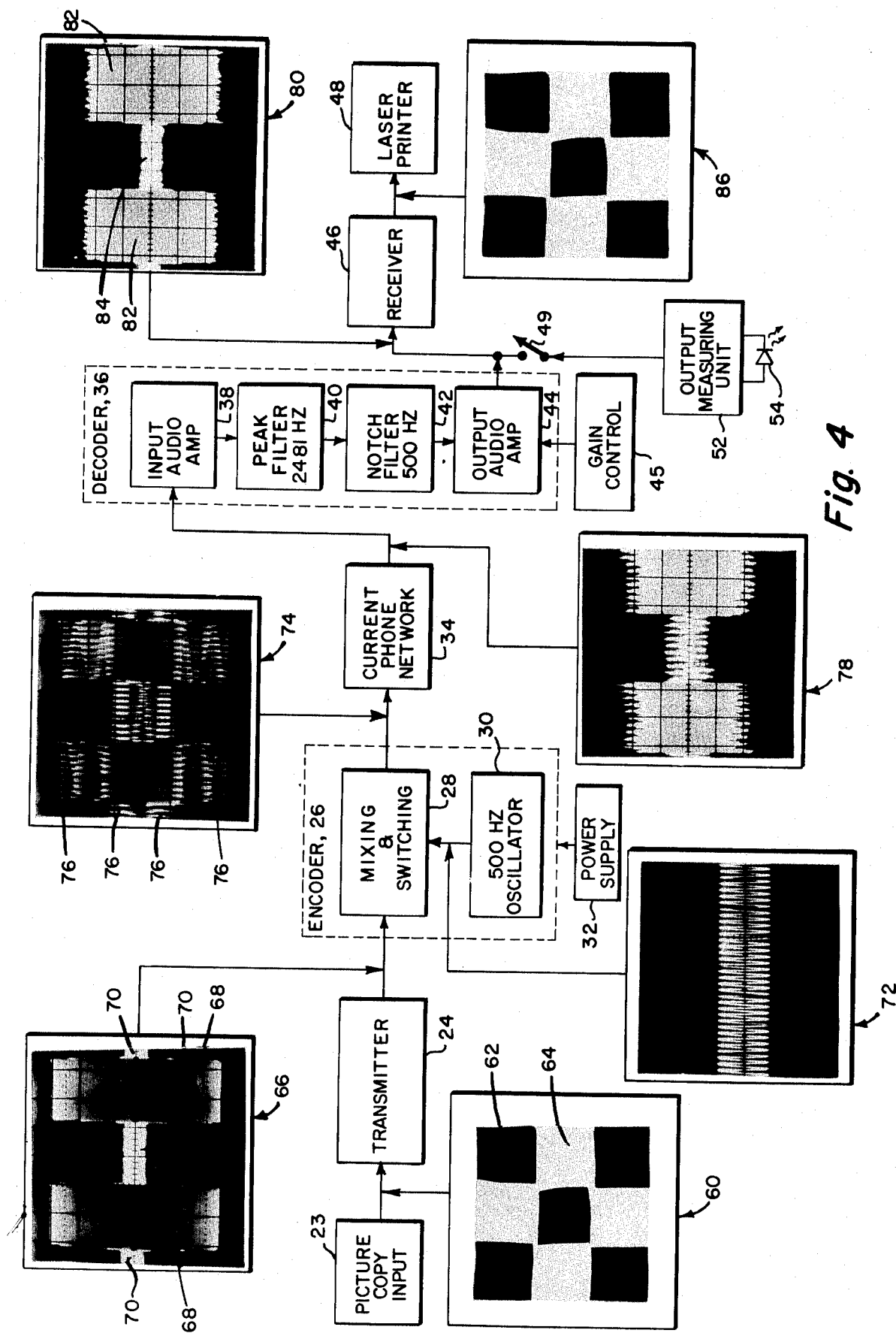

NOISE ELIMINATION SYSTEM FOR PICTURES AND THE LIKE

FIELD OF THE INVENTION

This invention relates a system for improving the quality of amplitude modulated (AM) or frequency modulated (FM) transmissions through a telephone network to eliminate drop-outs or breakups caused by rapidly varying AM or FM signals and the components or switching systems within the telephone network.

BACKGROUND OF THE INVENTION

It will be appreciated that press services maintain a newsphoto transmission network for its member newspapers in which photographs or negatives are sent over a leased telephone circuit by a local transmitter which converts the image to be transmitted into an amplitude modulated audio frequency signal. A receiver at the member newspaper converts the transmitted signal back into a high resolution photograph or negative available for use by the newspapers. When a story occurs in a remote location, the photograph may have to be transmitted on a regular dial-up circuit to a press bureau from which it can be transferred to the photo network. Alternatively, member newspapers may send a photographer to another city and transmit their photographs directly back to their newspaper on a dial-up telephone circuit.

While photojournalists have regularly been provided with portable transmitters which are high resolution picture transmitters that couple directly to the dial-up telephone, due to characteristics of certain new telephone networks, transmissions from many of the lines have had substantial numbers of streaks or drop outs, yielding unuseable pictures at the receiver end of the system. At times, a photographer, or other operator, must try more than ten telephone lines before a line is isolated that can be used to yield a clean transmission. This is, of course, time consuming and can take numbers of hours, resulting in either loss of the pictures or loss of timely reporting of the news via pictorial means.

The problem described above has only recently arisen. Prior to recent changes in telephone networks, it was generally a relatively simple matter to send a facsimile image or other type of image from a local telephone to the newspaper or news service. However, for reasons that cannot at present be explained, considerable difficulty has been experienced utilizing standard equipment for the purposes of transmitting high resolution photographs or negatives from one place to another utilizing commercially available telephone networks, whether alternative networks or those owned and operated by the American Telephone & Telegraph Company.

Spectral analysis of the signals has yielded no apparent reason for the breakup or degradation of the pictures transmitted. Moreover, the difficulties appeared to be more common during time periods when high phone line use would be expected, such as those times corresponding to the times when news events are taking place.

By studying a number of examples of the streaked transmissions, it was originally thought that electronic noise was the source of the problem since it seemed that audio signals generated by the local transmitters were in some way exciting or interfering with telephone company equipment which would respond by generating signals independent of the transmitted signals. However, no consistent explanation for the degradation of the finally received product was available.

It was then found that the problem occurred more frequently when changes from black areas on the original photograph to white areas were rapid or instantaneous. A test pattern resembling a checkerboard was constructed and it was ascertained that this type of rapid transition between a black area and a white area, or vice versa, excited the most amount of streaking when transmitted over certain types of telephone lines. It will be appreciated that in terms of the amplitude modulated signal transmitted over the audio bandwidth of the telephone network that rapid changes in signal amplitude from about $-55$ DBM to about $-10$ DBM in a period of a couple of micro-seconds produced the most picture degradation. Thus, it became apparent that there was a need for a solution which would be able to handle and eliminate the effect of any rapidly changing analog AM signal which was within the telephone network bandwidth of approximately 300 Hz to 3,000 Hz.

SUMMARY OF THE INVENTION

It has been found that by adding, superimposing or an off-frequency audio carrier with the output of the local transmitter and later removing this carrier, all degradation of the resulting photographs or other information is removed. While this technique works for both AM and FM transmission systems, only the AM system will be discussed for illustration purposes. It will be appreciated that AM systems have a single operating carrier frequency, whereas FM systems have a center frequency from which the modulation causes deviation. For simplicity, both are referred to as the operating frequency.

While at the present time it is not possible to ascertain the reason for the effectiveness of the above mentioned method of breakup or distortion removal, it is thought that the addition of the constant carrier either causes a tone lock to occur within the telephone switching system or that the new switching circuits in the network are stablized by the carrier so that erratic switching transitions are eliminated. Thus, if tone lock is achieved the network rather than cycling through its multiplexing scheme dedicates the circuit to the particular transmitter which originated the signal with carrier superimposed. In this case, it is thought that the carrier causes the telephone network to lock up to the particular line rather than multiplexing through a large number of lines if large signal swings in very short periods of time occur. The alternative explanation to the success of the above mentioned system is that the switches utilized in the telephone network which are incapable of responding to such rapid changes in signal strength in the micro-second region are stabilized so that they neither become unstable or inject spurious noise into the telephone network. Another explanation is the possibility that changes in echo suppression circuits now used cause the break up. Regardless of what explanation is utilized in explaining the difficulties in the transmission of photographs over newly adopted telephone networks, the result of utilizing an off-frequency carrier and removing it at the receiver end completely eliminates the problems introduced by the relatively new telephone networking systems. Note that by the term carrier is meant both any continuous wave (CW) constant amplitude signal or any off-frequency superimposed signal which does not have rapid amplitude or frequency transitions.

It should be noted that the normal operating frequency utilized for transmitters provided by the Associated Press is 2481 Hz. It has been found that a 500 Hz carrier attains optimum results, assuming that the decoder includes a peak filter tuned to 2481 Hz, with a deep notch filter tuned to remove any 500 Hz CW carrier component. Tests have indicated, however, that it is only necessary for the frequency of the carrier to be different from that of the transmitter frequency, with the greater the difference between the two providing more ease with which the carrier can be removed at the receiver end of the system. Thus, carriers have been used in the 3,000 Hz range, the 1,500 Hz range and the 700 Hz range with great success. In addition to the carrier frequencies mentioned above, carrier frequencies of 1000, 600 and 900 Hz have provided significantly improved picture quality.

With respect to the amplitude of the superimposed carrier signal vis-a-vis that of the transmitted signal, it may be equal to or less than that of the transmitted signal. Experimentation has shown that superimposed carriers more than approximately 4.5 DBM down from the peak-to-peak signal amplitude of the transmitter establish a practical limit as to the minimum strength of the signal which is to be used and mixed with the signal from the local transmitter. However, signals anywhere from 4.5 DBM down to that equaling the amplitude of the transmitted signal have proved satisfactory in the break up elimination process. Moreover, carriers having levels exceeding the peak-to-peak transmitted signal levels have also proved somewhat effective.

While the above description relates to the transmission of photographic images via translation of the photographic image into amplitude modulated or frequency modulated audio signals, the subject system may be utilized to eliminate drop-outs and other signal degradation problems when utilizing standard telephone networks, assuming that the problem which is causing the degradation of the received signal is the result of extremely rapid transitions between a high level amplitude modulated signal and a low level amplitude modulated signal, or a rapid large frequency shift in a frequency modulated signal. Thus, the subject system may be utilized, for instance, in data transmission systems over telephone networks in which improvement in the baud rate of a modem may be increased without loss of signal quality, assuming the signal degradation was due to the aforementioned rapid and large transitions between signal amplitudes or frequencies.

In summary, in an amplitude modulated or frequency modulated audio signal transmission system, a system for eliminating breakup of transmission of photographs, negatives or any rapidly changing audio signal from one remote location to another over standard telephone lines and networks includes superimposing a audio carrier signal on the signal from the picture or information transmitting unit, in which the superimposed carrier is of a frequency different from that of the operating frequency of the transmitter yet within the telephone network bandwidth. A decoder is utilized at the receiver end which includes a peak filter tuned to the transmitter frequency which is followed by a deep notch filter to remove the superimposed carrier, so as to eliminate breakup of picture quality at the receiver end due to a rapid transition in amplitude of the signals derived from a dark portion of the picture or negative adjacent a light portion, such that breakup or interference introduced by the telephone network, is eliminated from the received picture copy output. In one embodiment, a simple amplitude responsive measuring device utilizing a single LED indicator is used to set the gain of the decoder which when once set, need not be adjusted during transmission.

BRIEF DESCRIPTION OF THE DRAWINGS

These and other features of the subject invention will be better understood in conjunction with the detailed description taken in conjunction with the drawings of which:

FIG. 4 is a schematic diagram of the subject system illustrating the type of picture transmitted, the waveforms associated with the picture, the waveforms associated with the addition of the carrier and the waveforms associated with the demodulated carrier at the receiver end.

DETAILED DESCRIPTION

Figure 1:
FIGS. 1 and 1A illustrate the improvement in the received picture quality for signals transmitted with and without the subject system in place.
Figure 1A:

Referring now to FIG. 1, a black and white photograph 10 reproduced at the laser printer end of the network indicates that significant degradation of the picture occurs via the interposition of horizontal noise lines 14 which, with the new switching networks utilized by the various telephone companies, are prevalent more often than not. Prior to the subject invention, it was not understood as to what the origin of these lines were; but, after application of the aforementioned carrier which is decoded at the other end after going through the telephone network, the picture of FIG. 1A is produced as illustrated by reference character 12. As can be seen from FIG. 1A, all of the horizontal noise lines 14 of FIG. 1 are eliminated. These laser picture reproductions took place sequentially over the same telephone line with and without the subject system being interposed. The dramatic evidence of the removal of the noise problem is evident from the FIG. 1A picture. The same can be seen in FIGS. 2 and 2A in which the laser reproduced picture 10' shows vertically running noise lines 14' without the utilization of the subject system; whereas, as illustrated by picture 12' in FIG. 2A, all of the noise lines have been removed through the utilization of the addition of an audio carrier which is subsequently removed.

Figure 2:
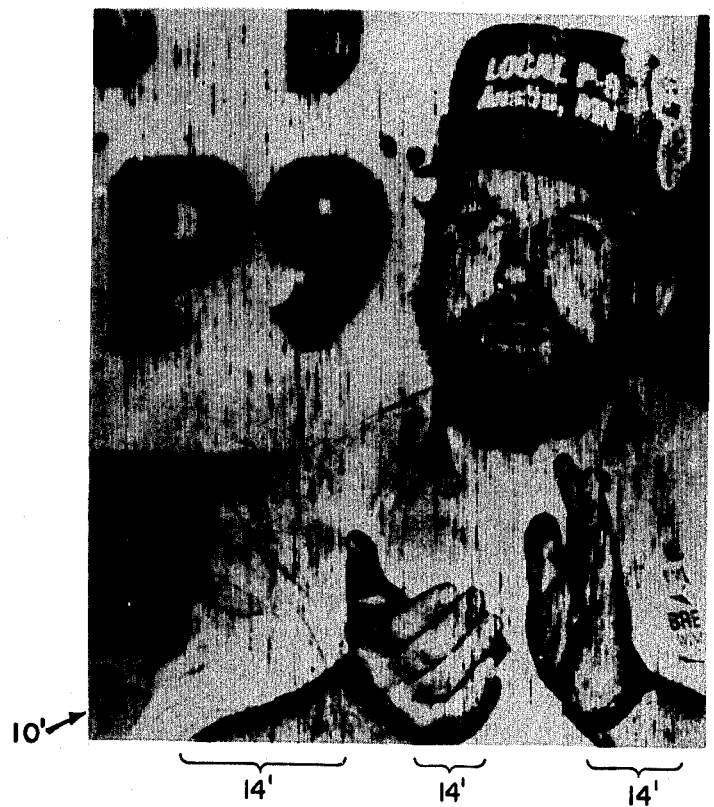
FIGS. 2 and 2A also illustrate the difference in picture quality for the subject system in place and switched out of the circuit showing the dramatic effects of the utilization of the subject circuit.
Figure 3:
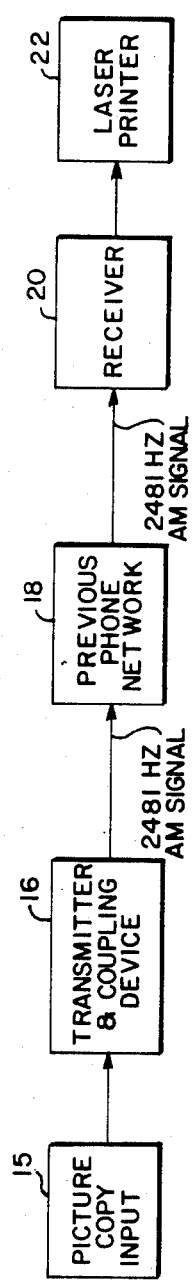
FIG. 3 is a block diagram illustrating the prior art picture transmission system.

Referring to FIG. 3, the prior art system which resulted in the noisy photographs, be they negatives or positives, included means 15 for inputting a picture copy, whether the picture be a traditional black and white photograph or a negative thereof. The picture copy was then transmitted via a transmitting and coupling device 16 which, in one embodiment, coupled a 2481 Hz AM signal to a telephone network 18 which transmitted the 2481 Hz am signal to a receiver 20 and thence to a laser printer 22. The previous telephone network 18 provided adequate transmission capabilities for the transmitters and the receivers such that the noise patterns of FIGS. 1 and 2 were not in evidence.

Subsequently, with an update of the switching facilities of the major telephone carrier company, American Telephone and Telegraph, the ability to obtain a "clear" line in which the above noted noise was not in evidence was indeed a time consuming procedure. It has turned out that the problem is at least due in part to relatively noisey switching devices within the new telephone networks which are unable to respond quickly enough to rapid changes in amplitude of the transmitted audio signal. As mentioned before, another possibility is changes in echo suppression techniques used by the telephone companies.

Referring now to FIG. 4, a picture copy input 23 is inputted to a standard transmitter 24 such as the AP Laser Photo Transmitter, the AP Portable Transmitter, the Unifax Transmitter or the Sat-Fax SF 2000 High Resolution Digital Scanner provided by the various news services; or may be a negative transmitter such as provided by Hasselblad or Nikon. The output of the transmitter, in any event, is an amplitude or frequency modulated audio frequency signal which is supplied to encoder 26 that includes a mixing and switching circuit 28 which is provided in one embodiment with the output of a CW oscillator oscillating at 500 Hz. Note encoder 26 is provided with a power supply 32. The output of encoder 26 is applied to the current telephone network 34 with its updated switching system that, under ordinary circumstances, would provide for the aforementioned degradation of picture quality at the laser printer end of the system. The output of the current telephone network is applied, in the present invention to a decoder 36 which, in one embodiment, includes an input audio amplifier 38, coupled to a peak filter 40 which is in turn coupled to a notch filter 42, the output of which is coupled to an output amplifier 44 controlled by a gain control circuit 45. In one embodiment, the peak filter is tuned to 2481 Hz whereas the notch filter is tuned to 500 Hz, although it is only necessary, in order to remove the aforementioned degradation from occurring that the peak filter be tuned to the transmission frequency whereas the notch filter is tuned to the carrier frequency which may be either above or below that frequency within the bandwidth of the telephone network over which the picture or negative is to be transmitted.

The output of audio amplifier 44 is coupled to a receiver 46 which is the standard receiver utilized in the reception of photographically transmitted images such as manufactured by The Associated Press or E G & G, and which is then coupled to a printer 48 which is likewise of a common variety and may be integral to the receiver. It will be appreciated that the picture transmitters, telephone networks, receivers and printers, be they laser or not, are common and are not described herein.

With respect to mixing and switching circuit 28, this may merely include a simple junction between the output of the oscillator and the output of the transmitter, with switching referring to merely switching the output of the oscillator into or out of the circuit depending on whether it is needed or not. The oscillator, in one embodiment, is available as Model XR2206 from Exar Inc.

With respect to decoder 36, the input audio amplifier 38 and the output audio amplifier 44 are available as Model No. LM386 manufactured by National Semiconductor Inc. Whereas, the peak filter 40 and the notch filter 42 are available commercially as a two section audio filter Model No. MFJ-752B, manufactured by MFJ Enterprises, Inc. of Mississippi State, Miss. This particular filter is referred to as the MFJ Signal Enhancer II which includes means for setting both the peak filter as well as the notch filter at any desired audio frequency.

A gain control 45, which controls the output of audio amplifier 44 is merely a potentiometer which controls the gain of audio amplifier 44.

As will be appreciated, and as can be seen from switch 49, an output measuring unit 52 may be coupled to the output of audio amplifier 44 which, in one embodiment, is available as Model LM3916 manufactured by National Semiconductor, Inc. which is an LED driver. This particular LED driver serves as an output measuring device by utilizing only one of the light-emitting diode outputs as indicating when a predetermined signal level has been achieved. This type of LED driver output measuring device is commonly used in commercially available audio equipment instead of VU meters in which a number of LEDs are activated by increasing input signal levels to the measuring circuit. The use of the measuring circuit is useful in that the gain control 45 is adjusted until the single light emitting diode is activated, at which time no further adjustment is necessary. This is utilized, in one embodiment, to indicate when the signal level equals −15 DBM.

It will be noted that the output measuring unit may be switched into and out of the system by switch 49 and that once set, it usually need not be reset regardless of where the transmission is coming from due to the automatic level control of most current telephone networks.

In operation, assuming a picture or negative 60 having a dark area 62 with a sharp boundary with a white area 64 is transmitted by transmitter 24, the output of transmitter 24 is amplitude modulated so as to obtain from the white areas the amplitude illustrated by reference characters 68 in photograph 66; whereas, the signal resulting from the dark area is indicated by reference character 70.

This type of pattern, be it a positive or negative pattern, represents the most serious problem for the current telephone networks in that there is a rapid transition at the interface of the black and white areas which corresponds to a rapid transition in the amplitude modulated signal from transmitter 24.

In order to prevent the switching networks within the telephone network 34 from introducing the aforementioned noise into the system, a carrier such as illustrated at 72 is mixed with the output of transmitter 24 so as to provide a signal such as illustrated at 76 in which the carrier is merely added to the signal applied by the transmitter as illustrated by photograph 66.

It will be appreciated that the added parts of the signal are designated by reference character 76 which produces what could be termed a "more ragged" signal in which the rapid amplitude changes are "chopped up", and are thus not as abrupt as would be the case without this superimposed carrier.

What is transmitted at the output of the current telephone network is illustrated at 78 which is then passed to decoder 36 such that the output of the decoder as illustrated at picture 80 includes a representation of the light areas at 82 and the dark areas at 84 in which, as illustrated at 86, the output to the laser printer, or other printing device, does not have the aforementioned degradation due to noise or dropouts.

Figure 2A:

While it is not known exactly why the interposition of a carrier and the removal thereof eliminates the dropout as mentioned before, the result is apparent from the photographs of FIG. 1 versus FIG. 1A and FIG. 2 versus FIG. 2A.

It should be noted that the subject system works both with positive prints a well as negatives and can also apply to any signal which, either by modem or otherwise, is converted into rapidly changing amplitude modulated or frequency modulated signals to be carried by telephone networks.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. A system for eliminating degradation in quality of a picture or negative sent from a first location via signals transmitted over a dialed-up telephone line in a telephone network to a second location at which a receiver and picture reproducing means are located, in which means coupled to said dialed-up line are provided at said first location for translating the picture or negative to be sent into audio frequency signals of a predetermined operating frequency, and in which a receiver is coupled to said dialed-up telephone line at said second location for receiving the audio frequency signals representing the transmitted picture or negative and for coupling the received signals to said picture reproducing means at said second location comprising:
   means at said first location for superimposing a carrier signal on the transmitted audio signals, said carrier signal being of a frequency different from the operating frequency of the audio frequency signals coupled to said phone line but within the audio bandwidth of said telephone network; and,
   means at said second location for removing said carrier signal to provide a carrier-removed signal for use by said picture reproducing means.

2. The system of claim 1 wherein said transmitted audio signals which are amplitude-modulated and have a predetermined operating frequency.

3. The system of claim 1 wherein said carrier signal is a continuous wave signal having a constant amplitude.

4. The system of claim 3 wherein the amplitude of said carrier signal is equal to or less than that of the amplitude-modulated signal coupled to said phone line.

5. The system of claim 1 wherein said carrier removing means includes a decoder including a peak filter tuned to said operating frequency and a notch filter tuned to the frequency of said carrier signal.

6. The system of claim 1 wherein said carrier signal frequency is removed and thus different in frequency from said operating frequency by more than 500 Hz.

7. One system of claim 1 wherein said operating frequency is 2481 Hz and said carrier signal frequency is 500 Hz.

8. The system of claim 1 and further including means coupled to said carrier-removed signal for adjusting the amplitude thereof.

9. The system of claim 8 wherein said carrier-removing means includes output amplifier means and means for varying the gain thereof.

10. The system of claim 1 and further including means for indicating when the carrier-removed signal is at a predetermined amplitude.

11. The system of claim 10 wherein said indicating means includes an LED driver providing an output when the amplitude of the input signal thereto exceeds one of successively increasing levels, and further including a single LED coupled thereto.

12. The system of claim 11 wherein the tap to which said single LED is coupled represents a signal strength of $-15$ DBM for the signal utilized for reproducing the transmitted picture or negative.

13. A method of eliminating signal degradation of audio signals of a predetermined operating frequency generated at and transmitted from a first location to a second location at which said transmitted signals are utilized, said transmission being through the use of telephone lines in a telephone network which permits transmission of said audio signals from said first location to said second location, comprising the steps of:
   superimposing on the audio signal generated at said first location a carrier signal of a frequency different from said operating frequency; and,
   removing said carrier signal from the transmitted signal arriving over said telephone lines at said second location prior to utilization of the transmitted signal at said second location.

14. The method of claim 13 wherein said carrier signal is a continuous wave signal.

15. The method of claim 14 wherein said continuous wave signal is of constant amplitude.

16. The method of claim 13 wherein the amplitude of the carrier signal is equal to or less than the peak-to-peak amplitude of the signal over which the carrier is superimposed.

17. A system for eliminating signal degradation of audio signals of a predetermined operating frequency transmitted from a first location to a second location at which said transmitted signals are utilized, said transmission being through the use of telephone lines in a telephone network which permits transmission of said audio signals from said first location to said second location, comprising:
   means for superimposing on the audio signal generating at said first location a carrier signal of a frequency different from said predetermined operating frequency; and
   means for removing said carrier signal from the transmitted signal arriving over said telephone lines at said second location prior to utilization of the transmitted signal at said second location.

18. The system of claim 17 wherein said carrier signal is a continuous wave signal.

19. The system of claim 18 wherein said continuous wave signal is of constant amplitude.

20. The system of claim 18 wherein the amplitude of the carrier signal is equal to or less than the peak-to-peak amplitude of the signal over which the carrier signal is superimposed.

* * * * *